United States Patent [19]
Robyn

[11] Patent Number: 5,002,910
[45] Date of Patent: Mar. 26, 1991

[54] PARTICULATE COMPOSITION FOR SURFACE TREATMENT OF REFRACTORIES

[75] Inventor: Pierre Robyn, Nivelles, Belgium

[73] Assignee: Glaverbel, Belgium

[21] Appl. No.: 537,806

[22] Filed: Jun. 14, 1990

Related U.S. Application Data

[62] Division of Ser. No. 285,391, Dec. 16, 1988.

[30] Foreign Application Priority Data

Dec. 17, 1987 [GB] United Kingdom ............... 8729418

[51] Int. Cl.$^5$ ............................................. C04B 35/46
[52] U.S. Cl. .................................... 501/103; 501/105; 501/107; 501/108; 264/30
[58] Field of Search ............... 501/103, 105, 107, 108; 264/30, 332; 427/421, 422, 427

[56] References Cited

U.S. PATENT DOCUMENTS

| | | | |
|---|---|---|---|
| 3,684,560 | 8/1972 | Brichard | 117/105.1 |
| 3,800,983 | 11/1974 | Brichard et al. | 222/52 |
| 4,489,022 | 12/1984 | Robyn et al. | 264/30 |
| 4,497,473 | 2/1985 | Robyn et al. | 266/44 |
| 4,542,888 | 9/1985 | Robyn et al. | 266/44 |
| 4,560,591 | 12/1985 | Plumat et al. | 427/422 |
| 4,792,468 | 12/1988 | Robyn et al. | 427/422 |
| 4,818,574 | 4/1989 | Mottet et al. | 427/422 |
| 4,911,955 | 3/1990 | Mottet et al. | 427/423 |

FOREIGN PATENT DOCUMENTS 792107  3/1958  United Kingdom .
2170191  8/1988  United Kingdom .

OTHER PUBLICATIONS

Jap. Pat. Abs., J-62-021, 753-A, Mitsui Petrochemical Ind. KK.
Jap. Pat. Abs., J56-059,679 Sumitomo Metal Ind. KK.

Primary Examiner—William R. Dixon, Jr.
Assistant Examiner—Chris Gallo
Attorney, Agent, or Firm—Spencer & Frank

[57] ABSTRACT

A particulate composition suitable for use in a process of dressing a refractory structure which includes the steps of projecting against a site of refractory structure to be dressed a comburent gas stream carrying a mixture comprised of fuel particles and refractory oxide particles, which fuel particles are comprised of at least one element which is oxidisable to form at least one refractory oxide; and causing or allowing the fuel particles to burn, the particulate composition being a mixture including fuel particles comprised of at least one element which is oxidisable to form a refractory oxide; refractory oxide particles; and particles of fluxing agent the fluxing action of which is such that when the mixture is projected in a comburent gas stream and the fuel particles are caused or allowed to burn, the refractory structure becomes softened to an extent such that the refractory structure becomes dressed by removal or displacement of material thereof under the mechanical action of the impinging comburent gas stream.

17 Claims, No Drawings

PARTICULATE COMPOSITION FOR SURFACE TREATMENT OF REFRACTORIES

This is a division of application Ser. No. 07/285,391 filed Dec. 16, 1988.

BACKGROUND OF THE INVENTION

1. Field of the Invention

This invention relates to a process of dressing a refractory structure. The invention also relates to a particulate composition suitable for use in a process of dressing a refractory structure.

While processes according to the present invention may be used for various purposes, they are of particular value as a stage in the repair of damaged refractory structures.

2. Description of the Related Art

Refractory structures of various types, such as metallurgical furnaces, coke ovens and glass melting furnaces tend to become damaged during the course of their working lives.

Such damage may for example be manifest as slippage of one or more refractory blocks in relation to the main structure which results in an irregular surface profile, or as cracking of the refractory structure. It is in general desirable to re-establish the designed surface profile of the refractory structure, and it is also desirable to prevent further slippage of the block(s) in question and to fill any gap left by its or their displacement or cracking. In order to achieve these ends, it may be necessary or desirable to cut away any protruding portion of the refractory structure. Alternatively or in addition it may be necessary or desirable to cut a keyway into a slipped block and/or a neighbouring block so that a key may be formed in or inserted into the keyway to prevent further slippage. Alternatively or in addition, it may be necessary or desirable to enlarge or shape any gap left by such slippage or cracking for the information or insertion of a suitable plug.

Such damage may alternatively be due to erosion of the material of the refractory structure. Such erosion tends to impart an irregular surface profile to the structure and it is often desirable to modify that surface profile before effecting a repair to the structure.

It may be necessary or desirable to form a hole in or otherwise dress a refractory structure for other purposes.

A refractory structure could of course be dressed mechanically, for example using a cutting wheel, drill or other tool, but this presents certain disadvantages for refractory repair. In order to dress the refractory and leave a surface suitable for repair, the operator would usually have to approach the dressing site quite closely, and this implies that that site would have to be at a temperature which the operator could tolerate for the time necessary to effect the dressing. This in turn implies that the refractory structure would have to be cooled from its normal operating temperature, or a temperature which is within its normal working cycle of operating temperatures. And it would have to be reheated after dressing and repair. In the case of industrial furnaces of various types, in order to avoid damage to the furnace as its refractory material contracts or expands, such cooling and reheating might have to be scheduled over a period of several days or even a few weeks, and this would accordingly represent a considerable loss in production from that furnace.

SUMMARY OF THE INVENTION

It is an object of this invention to provide a process of dressing a refractory structure which can be performed without any requirement to take positive steps to effect substantial and deliberate cooling of such a structure from a temperature which it is at during its normal operation, so avoiding the necessity of such lengthy cooling and reheating periods.

According to the present invention there is provided a process of dressing a refractory structure, characterised in that a comburent gas stream carrying a mixture of particles which comprises particles of one or more elements which is or are oxidisable to form one or more refractory oxides (hereinafter called "fuel particles") and refractory oxide particles, is projected against the site to be dressed and the fuel particles are caused or allowed to burn, the said mixture further incorporating a fluxing agent, the fluxing action of which is such that under the heat released by combustion of the fuel particles, the refractory structure becomes softened to an extent such that the structure becomes dressed by removal or displacement of material thereof under the mechanical action of the impinging stream.

The present invention thus provides a process of dressing a refractory structure which can be performed without any requirement to take positive steps to effect substantial and deliberate cooling of the structure from a temperature which it is at during its normal operation, so aboiding the necessity of lengthy cooling and reheating periods, and thus avoiding or reducing problems which might arise due to contraction or expansion of the refractory material. For example it is usually possible to work in such a manner that the refractory structure does not require cooling and heating through any transition point on the dilatometric curve of the material from which it is formed. Indeed, the higher the temperature of the refractory structure, the more efficient is the process of this invention. The process has the particular advantage of being easily usable for dressing structures which are of a rather high grade refractory, and/or which are at an elevated temperature which is nevertheless rather low in relation to the maximum tolerable operating temperature of the grade of refractory of which they are made.

The dressing process may be utilized simply for removing parts of refractory structures for various purposes. Sometimes a refractory structure may become so eroded that, instead of effecting repair simply by replacing the eroded material, it is more economical or otherwise desirable to remove additional refractory material to make room for the placement of a new block of refractory. It is sometimes necessary to cut holes in refractory blocks, for example in order to fit a keying block. Sometimes an arch block of a refractory structure drops down from its designed position to stand protruding from the refractory structure and it is necessary to remove a portion of such a block to rectify the profile of the structure. These procedures can be carried out by a dressing process in accordance with this invention because the fluxing agent allows the material being removed from the refractory structure to be maintained in softened or fluid condition so permitting it to be removed under the action of the impinging stream with minimum disruption to the normal operation of the structure due to undesirable cooling.

We have found that when a refractory structure is dressed in accordance with this invention, the dressed surface of that structure is of modified composition. This is because not all of the softened material is removed from that surface, and that softened material includes material which was projected in the dressing operation, including fluxing agent. Because of the presence of the fluxing agent, that softened material is more easily able to flow into a fill any fissures which may be present in the surface of the structure. This has the advantage of improving the integrity of the dressed surface: parts of the structure between such fissures are cemented into position so that they are less likely to fall away, and the filled fissures are no longer exposed to, for example, the atmosphere within the structure, which may be highly corrosive.

In the most preferred embodiments of the invention, the nature and proportion of the fluxing agent present in the projected mixture are such that the melting or softening temperature of the material removed from the refractory structure is at least 200° C. less than that of the refractory material of the structure being dressed. This has the advantage of enabling the process to be used even more easily for dressing structures which are of a rather high grade refractory, and/or which are at a temperature which is rather low in relation to the maximum tolerable operating temperature of the grade of refractory of which they are made. It is especially advantageous to have a large difference between the softening temperatures of the material being removed and the material at the core of the block from which that material is being removed in order to preserve the internal structure of the block during the dressing operation. This makes working easier in practice, especially when working at an outer surface of a block of the refractory structure. There will normally be an increasing temperature gradient from that outer surface towards the inner surface of the block, and this can make it difficult to dress the outside of such a block while preserving its core structure unless there is such a large difference in softening temperatures.

Advantageously, the fluxing agent used is a fluxing agent for the refractory material of at least some of said refractory oxide particles. This helps to maintain material originating from those particles and material originating from the refractory structure in softened or fluid condition for removal or displacement.

It is not necessary to use large quantities of fluxing agent. The optimum amount of fluxing agent has been found to be dependent, like the optimum amount of fuel, on the refractoriness i.e., refractory qualities, of the structure being dressed and its temperature. It is also desirable to use no more fluxing agent than is necessary in order to achieve the desired result. We have therefore found that it is preferable for the fluxing agent to be present in the projected mixture in a weight proportion not more than half that of said fuel particles, and preferably in a weight proportion not more than one third that of said fuel particles.

There are various fluxing agents which may be used, some of which depend on the composition of the refractory structure being dressed and the composition of the refractory oxide particles being sprayed. In some preferred embodiments of the invention, said fluxing agent comprises a fluoride. By way of example, ammonium bifluoride and magnesium fluoride are effective fluxing agents for many refractory oxide compositions. Alternatively, or in addition, it is preferred that said fluxing agent is a compound of a metal other than a metal having an oxide which is present in said refractory oxide particles. For example calcium carbonate may be used as a fluxing agent when working with certain aluminosilicate refractories, and magnesium carbonate may be used as fluxing agent when working with many refractory compositions, other than those containing magnesia. For general purposes, it is preferred that said fluxing agent comprises at least one alkali metal salt. Alkali metal salts are good fluxing agents for substantially all the refractory materials in view. The use of sodium salts is preferred for reasons of cost. Among the alkali metal salts which are most effective as fluxing agents are those selected from borate, sulphate, carbonate and phosphate, and their use is accordingly preferred.

For ease of projection of the particulate mixture, and in order to facilitate the desired result, it is advantageous that the mean grain size of the particles of fluxing agent is between one half and twice the mean grain size of said refractory oxide particles, and preferably, at least 50% by weight of the particles of fluxing agent have a grain size below 200 $\mu$m.

As has been stated, the dressing process of the invention is useful simply for trimming a refractory structure, or for cutting a hole therein. It is to be noted however that the dressing process has particular advantages when performed as a preliminary step in certain refractory repair processes, and particularly such repair processes as those which are themselves capable of being carried out at or near the normal operating temperature of a refractory structure.

One such repair technique has become known as ceramic welding. This type of process is illustrated by British Pat. No. 1,330,894 (U.S. Pat. No. 3,684,560) and British Patent Application published under No. GB 2.170.191 A (U.S. Pat. No. 4,792468) all in the name of Glaverbel). In such ceramic welding processes, a coherent refractory mass is formed on a surface by projecting against the surface a mixture of refractory particles and fuel particles, together with oxygen. The fuel particles used are particles whose composition and granulometry are such that they react exothermically with the oxygen to result in the formation of refractory oxide and release the heat required to melt at least the surfaces of the projected refractory particles.

The present invention also provides a ceramic welding process in which a coherent refractory mass is formed adherent to a refractory structure at a weld site by projecting a comburent gas stream carrying a mixture of particles which comprises particles of one or more elements which is or are oxidisable to form one or more refractory oxides (hereinafter called "fuel particles") and refractory oxide particles against the site of the weld and the fuel particles are caused or allowed to burn to soften or melt at least the surfaces of the refractory oxide particles so that a said coherent refractory mass is formed adherent to said structure, charcterised in that in a preliminary treatment step, the weld site is dressed by a refractory dressing process as herein defined.

In general it is recommended to project the particles in the presence of a high concentration of oxygen, for example using commercial grade oxygen as carrier gas. Because of the very high temperatures in the ceramic welding reaction zone, a sufficient melting or softening of the refractory particles can be achieved, and it is thus possible to form a highly coherent refractory mass with good refractoriness.

A particular advantage of ceramic welding processes is that they can be performed on the refractory structure while it is substantially at its normal hot working temperature. This has obvious benefits in that the "down time" of the structure being repaired can be minimised, as can any problems due to thermal contraction and expansion of the refractory. Welding at a temperatures close to the working temperature of the refractory structure also has benefits for the quality of the weld formed. The welding reactions tend to be able to soften or melt the surface of the structure, so that a good joint is made between the surface being treated and the newly formed refractory weld mass.

We have found that while it is usually possible to form a good joint between the base refractory structure and the weld mass, certain problems can arise which are substantially avoided by a ceramic welding process in accordance with the present invention. These problems have arisen from one of two basic causes: the temperature of the weld site on the refractory structure, and the temperature required to form the coherent refractory weld mass and join it to the base structure.

The normal temperature of the weld site may simply have been too low for the refractory structure there to have been heated sufficiently to soften it (as is required for a good joint) without playing the ceramic welding spray over it for a considerable period of time. During that time, much of the sprayed material will have rebounded from the structure and been wasted.

There are various possible reasons for a low temperature at the weld site. It will be borne in mind that refractories of various compositions and qualities are used for different parts of many refractory structures, depending usually on the working temperature to be encountered at the various locations. But sometimes a high grade refractory is used at a location where from temperature considerations alone one might expect that it would be suitable to use a lower grade refractory. While the prevailing temperature might be sufficient for forming a strongly adherent weld on such a lower grade refractory, it may not be high enough for forming a good weld on a higher grade refractory. As a particular example of this, we cite dog-house arches in glass-melting furnaces. Because the temperatures normally prevailing at the dog-house arch of an operating glass-melting furnace are not very high in relation to temperatures encountered elsewhere in the furnace, one might consider using a rather low grade of refractory material. But because the atmosphere in that region is rich in sodium vapours emanating from the melting batch of glass forming materials and is therefore very corrosive, it is common to make the dog-house arch from a high grade refractory known as "Zac".

Another reason for a low temperature at the weld site may simply be that the weld site is on the outside of the structure rather than on its inside. This causes problems no matter what grade of refractory is being treated.

The temperature required to form the weld can also cause problems, especially in relation to the formation of refractories of rather high grade composition. The problem is that in many cases in order to ensure softening of the refractory structure to achieve a good joint between the structure and the weld mass, the surface of the refractory structure must be brought to a very high temperature, and this temperature may be above a transition point on the dilatometric curve of the refractory material, while the working temperature of the refractory is below that transition point. As a result of this, there will be a difference in contraction across the joint between the newly formed refractory mass and the base refractory as the weld cools from its forming temperature to its working temperature, even when the base refractory and the newly formed mass have substantially identical chemical compositions. As a result stresses are set up, and the newly formed mass tends to crack and flake away from the base refractory.

The surface of a refractory structure dressed in accordance with this invention is of modified composition because not all of the softened material is removed from the dressed surface. The presence of a thin surface skin of refractory material containing fluxing agent which is well bonded to the base refractory structure can be especially advantageous if it is later desired to perform a ceramic welding process in order to deposit further refractory mass at that site. Because the new surface skin of the base refractory contains fluxing agent, it need not be heated so strongly in order to soften it, with the result that refractory material which has been softened by the ceramic welding reactions and impinges against that surface can more easily mix with material at that surface so promoting bonding of the refractory weld mass to the base structure. Also we have found that there is a tendency for the fluxing agent to become dispersed in the newly deposited weld mass so that it is of generally lower concentration and has a less disadvantageous effect on the refractoriness of the resulting structure. As a result flux content at the surface/weld mass interface is less than would be expected, and it is possible to achieve a transition zone between the original structure and the weld mass which ensures a good bond, and which at the same time does not have its refractoriness reduced as much as would be expected by the use of the fluxing agent. Indeed the transition zone can be quite thin so that the quality of the joint between the structure and the weld is improved without any noticeable impairment of the refractoriness of the new structure.

While it would of course be possible to incorporate a certain quantity of a fluxing agent in the ceramic welding mixture, this is not preferred unless the consequent reduction in the refractoriness of the weld mass can be tolerated. This aside, it is found convenient and effective for the mixture of particles which is projected in the ceramic welding step to have any one or more of the preferred features as will be hereinafter specified in respect of the fuel particles and/or the refractory particles of the refractory dressing mixture.

Indeed it is particularly convenient for the mixture of particles projected in the ceramic welding step to have substantially the same composition as that projected in the refractory dressing step save that in the ceramic welding step, the fluxing agent is omitted. Thus for example, the particulate mixture to be projected in the refractory dressing step may be made simply by adding an appropriate quantity of fluxing agent to a quantity of the mixture which is to be used in the ceramic welding step.

The granulometry of the fuel particles has a very important effect on the way the combustion reactions take place whether during dressing of a refractory structure or during a ceramic welding process. We have found that it is desirable to make use of very finely divided fuel particles. Preferably, at least 50% by weight of said fuel particles have a grain size below 50 $\mu$m, and advantageously, at least 80% by weight of said fuel particles have a grain size below 50 $\mu$m. It is preferred that at least 50% by weight of said fuel particles have a grain size below 30 $\mu$m, and for optimum results, at least 80% by weight of said fuel particles have a grain size below 30 μm.

Various elements may be used as fuel, including magnesium and zirconium, but it is preferred that said fuel particles comprise particles of aluminium and/or silicon, since these elements give a good compromise between efficacity, ease and safety of use and cost. It is especially preferred to use a mixture of aluminium and silicon particles, preferably one in which there is more silicon than aluminium. The aluminium which is more easily ignitable serves to maintain a reaction zone in which the silicon burns and the combined heat generated can be sufficient for the purposes in view.

The optimum amount of fuel particles to be incorporated in the particulate mixture will depend on the working conditions. For a given refractory operating temperature, it is generally desirable to incorporate more fuel the higher is the grade of the refractory. Likewise, for a given refractory, it is desirable to incorporate more fuel the lower is the operating temperature at the welding or dressing site. Depending on circumstances, it may be desirable for the mixture used for dressing to have a slightly higher fuel content than is present in a mixture used for ceramic welding. In general, we have found that in order to achieve a satisfactory dressing or ceramic welding operation, it is quite sufficient to incorporate fuel in the projected mixture in amounts of up to 30% by wieght. Advantageously, said fuel particles are present in a proportion not exceeding 30% by weight of the projected mixture of particles. This has the advantage of economy, since the fuel particles are the most expensive part of the projected mixtures. Also we have found that the incorporation of excessive amounts of fuel particles may unjustifiably increase the risk that the reaction generated could propagate back along the projection apparatus causing, at best, stoppage of the dressing or welding operation and at worst, an explosive risk to the operating personnel.

Advantageously, said fuel particles are present in a proportion not less than 8% by weight of the projected mixture of particles. This represents a satisfactory compromise between the amount of fuel to be incorporated and the length of time for which the reaction zone has to be played over the site being dressed or welded. It will of course be appreciated that more fuel may be required for acting on low temperature, high grade refractories, and that less may be required when operating on high temperature, low grade refractories.

The choice of refractory oxide particles for the projected mixture has an effect on the quality and adherence of the surface deposit which is formed during welding and on the modification of the surface of the refractory structure which is being dressed. In order to reduce problems which may be encountered due to differential thermal expansion or contraction of the surface skin of the refractory structure or at its interface with a weld deposit, it is generally desirable that the composition of the surface of the structure should not be greatly modified and that the weld deposit should also be of broadly similar chemical composition. This also gives chemical compatibility between the deposit and the structure. Obviously perfect correspondence between the compositions of the surface and the underlying refractory structure cannot be attained because of the incorporation of fluxing agent in that surface. Nonetheless, in order to promote adherence and compatibility, it is preferred that said refractory oxide particles comprise particles of at least the major constituent(s) of the refractory structure.

In preferred embodiments of process according to either aspect of the invention, said refractory particles are selected from oxides of at least one of aluminium, chromium, magnesium, silicon and zirconium.

Advantageously, said refractory oxide particles are present in a proportion not less than 75% by weight of the projected mixture of particles. It is surprising that the same high quantity of oxide particles should be contemplated for incorporation in a mixture which is to be used on the one hand for what is in essence a process of removing refractory material from a refractory structure and on the other hand, a process of depositing refractory material onto the same refractory structure. This is nevertheless the case. The incorporation of such amounts of refractory oxide has benefits in reducing the risk of backward propagation of the dressing or welding reactions, since for a given quantity of fuel used, it tends to reduce the speed of reaction propagation.

The present invention extends to a particulate composition suitable for use in a refractory dressing process as herein defined, and it accordingly includes a particulate composition suitable for use in a process of dressing a refractory structure, wherein the composition comprises particles of at least one element which is oxidisable to form a refractory oxide (hereinafter called "fuel particles") and refractory oxide particles, and the said mixture further incorporates an alkali metal salt as fluxing agent, the fluxing action of which is such that when the mixture is projected in a comburent gas stream and the fuel particles are burnt, the refractory structure becomes softened to an extent such that the structure becomes dressed by removal or displacement of material thereof under the mechanical action of the impinging stream.

Such a composition is very useful and effective when used in a refractory dressing process, for example a process as hereinbefore defined.

As has been stated, the granulometry of the fuel particles has a very important effect on the way combustion reactions take place. Preferably, at least 50% by weight of said fuel particles have a grain size below 50 μm, and advantageously, at least 80% by weight of said fuel particles have a grain size below 50 μm. It is preferred that at least 50% by weight of said fuel particles have a grain size below 30 μm, and for optimum results, at least 80% by weight of said fuel particles have a grain size below 30 μm.

Various elements may be used as fuel, including magnesium and zirconium, but it is preferred that said fuel particles comprise particles of aluminium and/or silicon, since these elements give a good compromise between efficacity, ease of use and cost. It is especially preferred to use a mixture of aluminium and silicon particles, preferably one in which there is more silicon than aluminium. The aluminium which is more easily ignitable serves to maintain a reaction zone in which the silicon burns and the combined heat generated can be sufficient for the purposes in view.

The optimum amount of fuel particles to be incorporated in the particulate mixture will depend on the working conditions under which it is to be used. In general, we have found that in order to achieve a satisfactory dressing operation, it is quite sufficient to incorporate fuel in the projected mixture in amounts of up to 30% by weight. Preferably, said fuel particles are present in a proportion not exceeding 30% by weight of the projected mixture of particles. This has the advantage of economy, since the fuel particles are the most expensive part of the projected mixture. Also we have found that the incorporation of excessive amounts of fuel particles may unjustifiably increase the risk that in use, the dressing reactions generated will propagate backwards along the projection apparatus.

Advantageously, said fuel particles are present in a proportion not less than 8% by weight of the projected mixture of particles. This represents a satisfactory compromise between the amount of fuel to be incorporated and the length of time for which the dressing reaction zone has to be played over the site being dressed. It will of course be appreciated that more fuel may be required for acting on low temperature, high grade refractories, and that less may be required when operating on high temperature, low grade refractories.

Advantageously, said refractory oxide particles are present in a proportion not less than 75% by weight of the projected mixture of particles. It is surprising that such a high quantity of oxide particles should be contemplated for incorporation in a mixture which is to be used for what is in essence a process or removing refractory material from a refractory structure. This is nevertheless the case. The refractory particles used appear to have some sort of abrading effect on the site being dressed, so speeding the dressing process. Of course some of the refractory oxide particles projected do become softened or melted so that they coalesce with material displaced from the surface of the refractory structure, and they are not entirely removed so that they form a surface skin deposit on the dressed refractory.

The choice of refractory oxide particles for the projected mixture has an effect on the quality and adherence of the modified surface skin which remains on the refractory structure which has been dressed. In order to reduce problems which may be encountered due to differential thermal expansion or contraction of the deposit and the refractory structure, it is generally desirable that the deposit and the structure should have broadly similar chemical compositions. This also gives chemical compatibility between the deposit and the structure. Obviously perfect correspondence between the compositions of the surface deposit and the refractory structure cannot be attained because of the incorporation of fluxing agent in the deposit. The particulate composition of the invention may be used for dressing various compositions of refractory structure, and it is preferred that said refractory particles are selected from oxides of at least one of aluminium, chromium, magnesium, silicon and zirconium.

It is not necessary to use large quantities of fluxing agent. The optimum amount of fluxing agent has been found to be dependent, like the optimum amount of fuel, on the refractoriness of the structure being dressed and its temperature. It is also desirable to use as little fluxing agent as is necessary. We have therefore found that it is preferable for the fluxing agent to be present in the projected mixture in a proportion not more than half that of said fuel particles, and preferably in a proportion not more than one third that of said fuel particles.

There are various fluxing agents which may be used. In some preferred embodiments of the invention, said fluxing agent comprises a fluoride. Alternatively, or in addition, such fluxing agent may comprise an alkali metal salt. Of the alkali metal salts, the use of a sodium salt is preferred for reasons of cost. Among the alkali metal salts which are most effective as fluxing agents are those selected from borate, sulphate, carbonate and phosphate, and their use is accordingly preferred.

For ease of projection of the particulate mixture, and in order to facilitate the desired result, it is advantageous that the mean grain size of the particles of fluxing agent is between one half and twice the mean grain size of said refractory oxide particles, and preferably, at least 50% by weight of the particles of fluxing agent have a grain size below 200 $\mu$m.

DESCRIPTION OF THE PREFERRED EMBODIMENTS

Preferred embodiments of the invention will now be described in greater detail by way of example only.

In the following description, the apparatus used for projecting the mixtures of particles was in all cases apparatus as described in our British Pat. No. 1,330,894.

Example 1

In a glass melting furnace, a block of 'Zac' refractory material had become displaced and was at risk of falling into the furnace. This 'Zac' refractory has an approximate composition by weight of 10–15% silica, 40–55% alumina and 30–45% zirconia. It was desired to secure that block to a neighbouring block which was formed of mullite. The normal operating temperature of the wall in that part of the furnace was slightly less than 800° C. In order to secure the Zac block, it was decided to cut a keyway into the mullite block, and to fill that keyway with a refractory mass formed by ceramic welding. Because of the special shape of the Zac block it was not necessary to cut a keyway into that.

A ceramic welding composition being a mixture of particles was made up as follows (parts by weight):
Si, 11.
Al, 9.
Stabilised zirconia, 30.
alpha-alumina (corundum) 45, (total 95).

The silicon and aluminium fuel particles had a nominal maximum grain size below 45 $\mu$m. The mean grain size of the silicon was 6 $\mu$m. We use the expression "mean grain size" to denote a size such that 50% by mass of the particles have a size smaller than that mean. The mean grain size of the aluminium was 5 $\mu$m. The mean grain size of the zirconia was 150 $\mu$m, and that of the alumina was 100 $\mu$m.

This ceramic welding powder composition was divided into two portions, and to one of those portions was added sodium carbonate as fluxing agent in an amount such that that portion contained 5% by weight sodium carbonate. This was done in order to form a dressing powder composition. The mean grain size of the sodium carbonate was similar to that of the zirconia.

The dressing powder composition was projected against the blocks to be dressed in a stream of commercial grade oxygen using a lance as described in British Pat. No. 1,330,894. Due to the presence of the fluxing agent, and notwithstanding the rather low operating temperature of the mullite refractory, it was found that material from the mullite block could be removed quite rapidly to form a keyway.

When the desired depth of cut had been reached, the powder mixture supplied to the lance was changed to the ceramic welding powder composition given above. This was of course the same composition as that used for dressing, but minus the fluxing agent. In the absence of the fluxing agent, it was found extremely difficult to remove more material from the refractory structure. On the contrary, a coherent weld mass was deposited which was strongly adherent and formed a key which prevented further displacement of the Zac block. The ease with which such a strongly adherent weld mass was formed was rather surprising considering the rather high grade of the refractory composition of that weld mass and the rather low ambient temperature at the work site. This strong adherence was attributed in part to the presence of a thin skin between the mullite block and the weld mass which contained fluxing agent remaining from the earlier dressing operation and which became transformed during the welding operation into a transition layer between the block and the weld mass and promoted bonding therebetween.

In a variant, bonding between the weld mass key and the Zac block was promoted by a preliminary dressing operation on that block to form a skin thereon containing fluxing agent.

The whole dressing and repair operation could be performed easily and quite rapidly, and there was substantially no loss of furnace production.

In a variant, that portion of the powder composition which was used in the ceramic welding step was supplemented with a further 5 parts by weight of corundum.

Example 2

Zac blocks forming the exterior face of a dog house arch of a glass melting furnace developed cracks and fissures, and parts of those Zac blocks fell away. In order to effect a repair, the remaining surface of the arch was first dressed using a dressing mixture as described in Example 1. The dressing process resulted in the softening of loose material and its removal from the arch by mechanical action mainly due to the projected refractory particles, and it also resulted in the formation of a surface skin containing fluxing agent which, because of its fluidity, was able to penetrate into and substantially fill the fissures remaining. This surface skin was also highly efficacious for promoting bonding between the dressed arch structure and a ceramic weld mass which was subsequently deposited.

The ceramic weld mass was built up by projecting a powder composition made up as follows:

A first mixture, "mixture A", was made up containing by weight 87% silica, 12% silicon and 1% aluminium. The silicon and aluminium had the respective granulometries specified in Example 1, and the silica had a mean grain size of about 450 μm.

A second mixture, "mixture B", was made up containing by weight 45% corundum, 43% stabilised zirconia, 8% silicon and 4% aluminium. These materials had the respective granulometries specified in Example 1.

These two mixtures "A" and "B" were themselves mixed together in equal proportions by weight to form the ceramic welding powder composition which was projected to build up a repair weld mass on the dressed dog house arch.

The resulting weld mass was found to adhere very well to the Zac blocks which had been dressed.

In a test, it was noted that the ceramic welding mixture of Example 1, that is a composition equivalent to the dressing mixture used in this Example but without the fluxing agent, was of very low efficiency for preliminary dressing of the Zac blocks of the dog house arch structure, and also that it was rather difficult to build up a repair weld mass at that location directly onto blocks treated using that unfluxed mixture. This was attributed to the rather low operating temperature of those blocks and their very high refractory grade. Both of these factors combine to militate against such softening of the surface of the blocks as is necessary to achieve the best adherence between the base refractory structure and the deposited weld mass. The excellent adherence between the weld mass and the dressed blocks on the other hand was attributed at least in part to the presence of a surface skin rather rich in fluxing agent due to the dressing operation, which skin was accordingly more easily softened. Surprisingly, the interlayer due to the presence of this skin was not as deleterious for the refractoriness of the resulting repair as was expected. It is believed that the composition of that skin was modified during deposition of the weld mass with the result that the fluxing agent became more widely distributed in the refractory structure so that in the finished repair the concentration of flux was reduced so as not to have a notably disadvantageous effect on the softening point of the refractory material in which it was incorporated.

Example 3

Cracks developed in silica blocks at the exterior of a furnace where the normal wall temperature was about 450° C., and parts of the structure fell away.

Such a fault would be extremely difficult to repair by any previously known method. The site was too hot for any known wet-cementing technique, but too cold for previously known ceramic welding techniques.

In order to effect repair, the wall area surrounding the repair site was insulated, so that the repair site became heated to a temperature of about 750° C. The repair site was dressed by projecting refractory dressing powder through a lance, and the repair was completed by ceramic welding.

Due to the nature and proportion of the fluxing agent present in the projected mixture, the softening temperature of the material removed from the repair site was more than 200° C. less than that of the silica of which the refractory blocks were formed. This facilitated removal of material from those blocks without disturbing their internal core structure.

In order to form the ceramic welding powder, mixture "A" of Example 2 was supplemented with an additional 3 parts aluminium, and this was further supplemented with 5 parts sodium carbonate as fluxing agent to form the refractory dressing powder.

The additional fuel was used because of the rather low temperature of the repair site.

Example 4

The following is a suitable powder mixture according to this invention for use in dressing an aluminous refractory structure by a process in accordance with the invention.

Si, 11.
Al, 9.
Sodium carbonate, 5.
alpha-alumina (corundum), 75.

The proportions given are proportions by weight and the various ingredients have the respective granulometries specified in Example 1.

The same mixture, minus the fluxing agent, and optionally using less metallic fuel, is suitable for use in a subsequent ceramic welding process in accordance with this invention.

In a variant dressing process in accordance with this invention, the sodium carbonate may be replaced by calcium carbonate or magnesium carbonate as fluxing agent.

In other variant processes and compositions in accordance with this invention, the sodium carbonate fluxing agent is replaced by sodium borate, sodium sulphate or sodium phosphate.

In other variant processes and compositions in accordance with the invention, the powder mixture is modified to take account of the composition of the refractory structure being treated.

What is claimed is:

1. A particulate composition suitable for use in a process of dressing a refractory structure which comprises the steps of projecting against a site of a refractory structure to be dressed a comburent gas stream carrying a mixture comprised of fuel particles and refractory oxide particles, which fuel particles are comprised of at least one element which is oxidisable to form at least one refractory oxide; and causing or allowing the fuel particles to oxidize, the particulate composition being a mixture comprising:

fuel particles comprised of at least one element which is oxidisable to form a refractory oxide;

refractory oxide particles; and particles of fluxing agent the fluxing action of which is such that when the mixture is projected in a comburent gas stream and the fuel particles are oxidized, the refractory structure becomes softened to an extent such that the refractory structure becomes dressed by removal or displacement of material thereof under the mechanical action of the impinging comburent gas stream.

2. The particulate composition according to claim 1, wherein at least 50% by weight of said fuel particles have a grain size below 50 μm.

3. The particulate composition according to claim 2, wherein at least 80% by weight of said fuel particles have a grain size below 50 μm.

4. The particulate composition according to claim 1, wherein said fuel particles comprise particles of at least one of aluminum and silicon.

5. The particulate composition according to claim 1, wherein said fuel particles are present in a proportion not exceeding 30% by weight of the mixture of particles to be projected.

6. The particulate composition according to claim 1, wherein said fuel particles are present in a proportion not less than 8% by weight of the mixture of particles to be projected.

7. The particulate composition according to claim 1, wherein said refractory oxide particles are present in a proportion not less than 75% by weight of the mixture of particles to be projected.

8. The particulate composition according to claim 1, wherein said refractory particles comprise at least one oxide selected from the group consisting of oxides of aluminium, chromium, magnesium, silicon and zirconium.

9. The particulate composition according to claim 1, wherein said particles of fluxing agent are present in the mixture to be projected in a weight proportion which is not more than half of that of said fuel particles.

10. The particulate composition according to claim 9, wherein said particles of fluxing agent are present in the mixture to be projected in a weight proportion which is not more than one third of that of said fuel particles.

11. The particulate composition according to claim 1, wherein said particles of fluxing agent comprise at least one sodium salt.

12. The particulate composition according to claim 1, wherein said particles of fluxing agent comprise a fluoride compound.

13. The particulate composition according to claim 1, wherein said particles of fluxing agent comprise at least one alkali metal salt selected from the group consisting of borates, sulfates, carbonates and phosphates of alkali metals.

14. The particulate composition according to claim 1, wherein the refractory oxide particles and the particles of fluxing agent each have a mean grain size, and wherein the mean grain size of the particles of fluxing agent ranges between one half and twice the mean grain size of said refractory oxide particles.

15. The particulate composition according to claim 1, wherein at least 50% by weight of the particles of fluxing agent have a grain size below 200 μm.

16. The particulate composition according to claim 1, wherein the fluxing agent is at least one alkali metal compound.

17. The particulate composition according to claim 1, wherein the fluxing agent is at least one salt selected from the group consisting of calcium carbonate, magnesium carbonate; ammonium bifluoride and magnesium fluoride.

* * * * *